Nov. 30, 1965  J. MARTIN  3,220,668
HARNESS SAFETY DEVICE FOR AIRCRAFT SEATS
Filed Feb. 13, 1964  5 Sheets-Sheet 3

Inventor
JAMES MARTIN
By

Nov. 30, 1965           J. MARTIN           3,220,668
HARNESS SAFETY DEVICE FOR AIRCRAFT SEATS
Filed Feb. 13, 1964           5 Sheets-Sheet 5
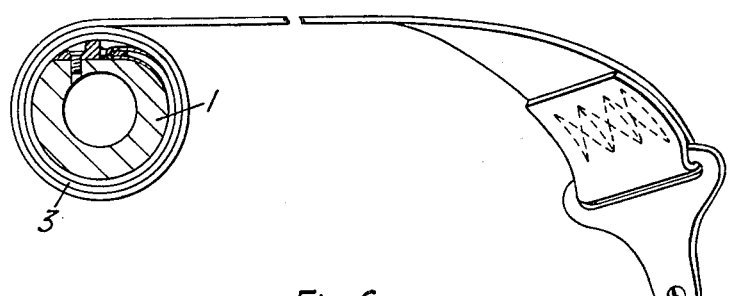
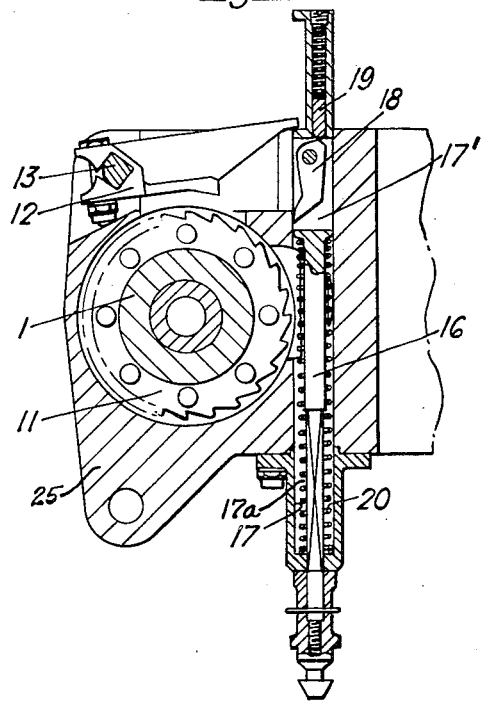

United States Patent Office 3,220,668
Patented Nov. 30, 1965

3,220,668
HARNESS SAFETY DEVICE FOR AIRCRAFT SEATS
James Martin, Southlands Manor, Southlands Road, Denham, near Uxbridge, Middlesex, England
Filed Feb. 13, 1964, Ser. No. 344,611
Claims priority, application Great Britain, Feb. 27, 1963, 7,934/63
3 Claims. (Cl. 242—107.4)

This invention concerns aircraft seats and is especially concerned with harness arrangements for securing an occupant in such a seat; the invention is especially applicable to the harness arrangements of aircraft ejection seats.

It is known to provide an aircraft seat with a harness arrangement having "forward reach" facility with a control mechanism which, when operated, frees the harness shoulder straps in a manner permitting the seat occupant to lean forwardly. Such an arrangement is, for instance, disclosed in the specification of Patent No. 3,036,796. It is also known to incorporate an "inertia lock" in such an arrangement, such inertia lock automatically responding to specified acceleration conditions to override the forward reach control mechanism, if in operated condition, thereby so to lock the shoulder straps as to restrain movement of the seat occupant forwardly of the seat.

Usually, harness arrangements having a forward reach facility (with or without inertia lock) comprise shoulder straps that are associated with at least one spring-loaded reel that maintains light tension in such straps when the forward reach facility is in use.

With such arrangement, when the forward reach facility is inoperative, the harness shoulder straps may be tightened, e.g. by means of adjustment buckles, to secure the seat occupant firmly and comfortably in the seat. However, following operation of the forward reach control mechanism, the tension in the shoulder straps is determined by the spring loading of the reel or reels associated with the straps and, when the forward reach facility is subsequently rendered inoperative, the shoulder harness straps will usually be slacker than is desirable, since the tension therein, prior to rendering the forward reach facility inoperative, is generally considerably less than that required to retain the seat occupant firmly and comfortably in the seat. Accordingly, the seat occupant, if he wishes to restore to the harness shoulder straps the greater tension existing prior to operation of the forward reach control mechanism, must resort to deliberate re-adjustment of the strap tension, e.g. by means of the aforesaid adjustment buckles.

This is undesirable for two reasons: first, the re-tightening of the harness shoulder straps by means of adjustment buckles involves distraction of the seat occupant's attention from other duties; secondly, if the forward reach control mechanism is operated several times in the course of a flight and the seat occupant re-adjusts the harness shoulder strap tension each time the forward reach facility is rendered inoperative, the repeated adjustment of the harness shoulder straps will progressively take up the amount of forward movement permitted to the seat occupant by the forward reach facility when in use and thereby render the latter of decreasing utility. In addition, the amount of adjustment obtained by adjustment buckles is usually limited, and continual re-adjustment may eventually take up all the adjustment available.

These disadvantages of the known arrangements cannot satisfactorily be overcome by providing an increased spring-loading on the reel or reels associated with the harness shoulder straps, since any such increase in spring-loading compromises the freedom of the seat occupant to move forwardly in the seat when the forward reach facility is in use.

Accordingly, the principal object of the present invention is to provide a seat harness arrangement including a forward reach facility and means for readily restoring harness shoulder strap tension to a desired value after use of the forward reach facility without recourse to devices such as adjustment buckles.

Thus, the present invention provides a seat harness arrangement including harness shoulder straps associated with at least one spring-loaded reel, such reel coacting with a manually operable ratchet mechanism for rotating the reel in the sense to wind in said straps for increasing the tension therein.

Conveniently, such ratchet mechanism comprises a ratchet wheel rigid with said reel and a pawl reciprocable by means of a manually operable device so as to engage and incrementally rotate said ratch wheel in the sense to wind in the harness shoulder straps, rotation of the ratchet wheel in the opposite sense being restrained by a control pawl riding on said ratchet wheel. Said control pawl may conveniently constitute part of the control mechanism for the forward reach facility, said control pawl being coupled to a forward reach control device whereby such pawl may be withdrawn, when desired, from engagement with the ratchet wheel so as to free the reel for rotation in the sense to pay out the harness shoulder straps.

Said control pawl may also constitute part of an inertia lock, the control pawl cooperating with an acceleration-sensitive spring toggle mechanism that responds to predetermined inertia loads to cause the control pawl to engage the ratchet wheel independently of the condition of the forward reach control device.

Whilst the invention is generally applicable to aircraft seat harness arrangements, it is especially applicable to harness arrangements incorporating a harness shoulder strap retraction mechanism such as disclosed in my simultaneously filed copending application Ser. No. 344,613. A typical embodiment of the present invention as applied to a seat harness arrangement having retraction mechanism as disclosed in such copending application is illustrated, by way of example, in the accompanying drawings in which:

FIGURE 5 is a fragmentary sectional view taken on the line V—V of FIGURE 2; and

FIGURE 6 is a sectional view taken on the line VI—VI of FIGURE 2.

Figure 1:
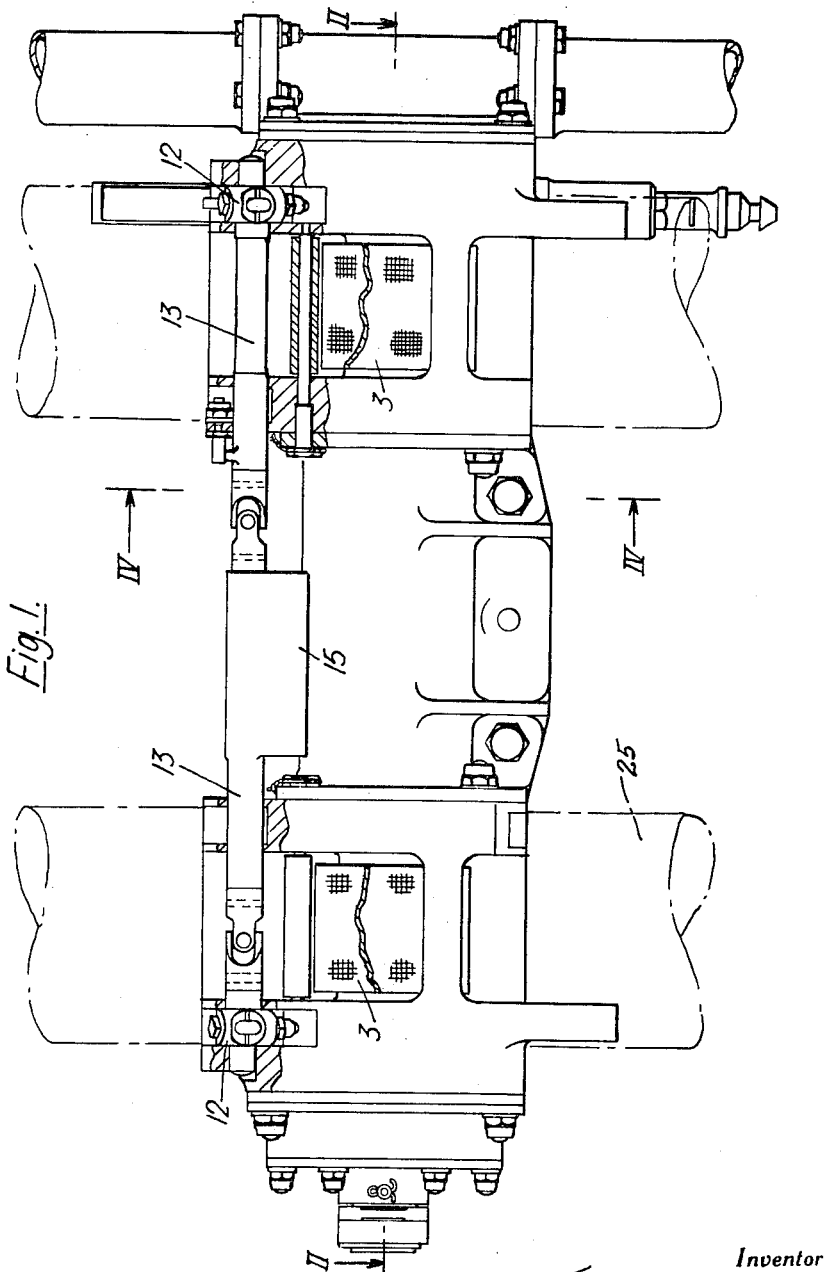
FIGURE 1 is a front view of a combined retraction mechanism, inertia lock and harness tensioning device.
Figure 2:
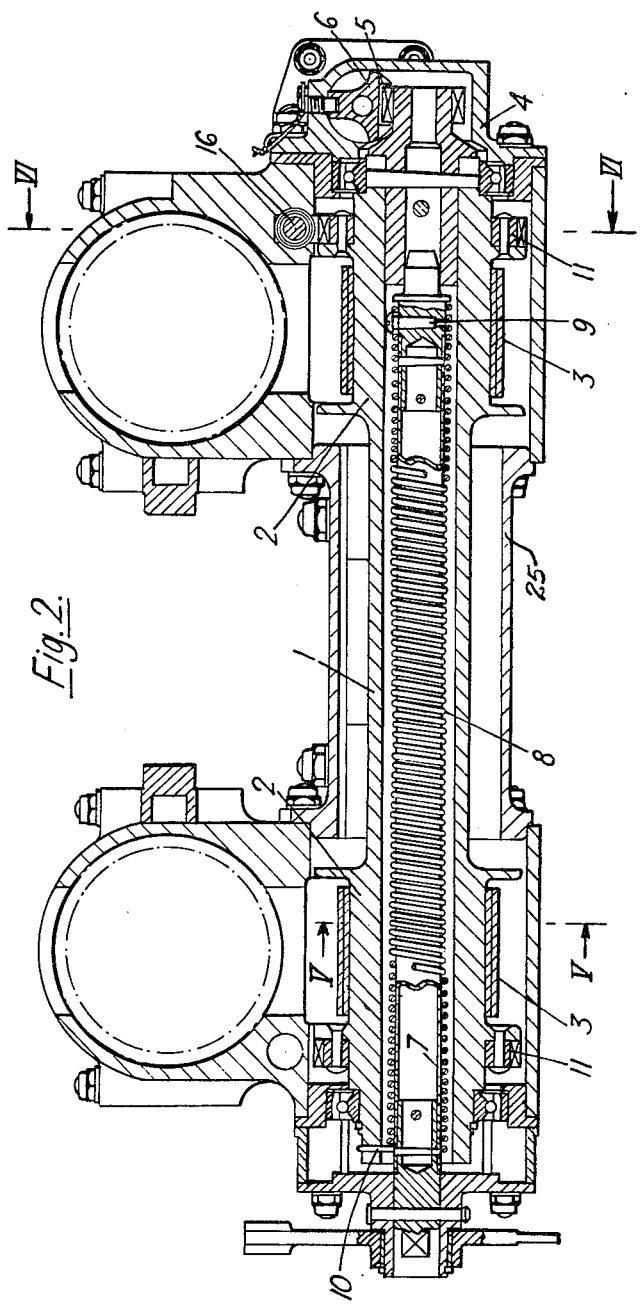
FIGURE 2 is a horizontal medial sectional view on the line II—II of FIGURE 1.
Figure 3:
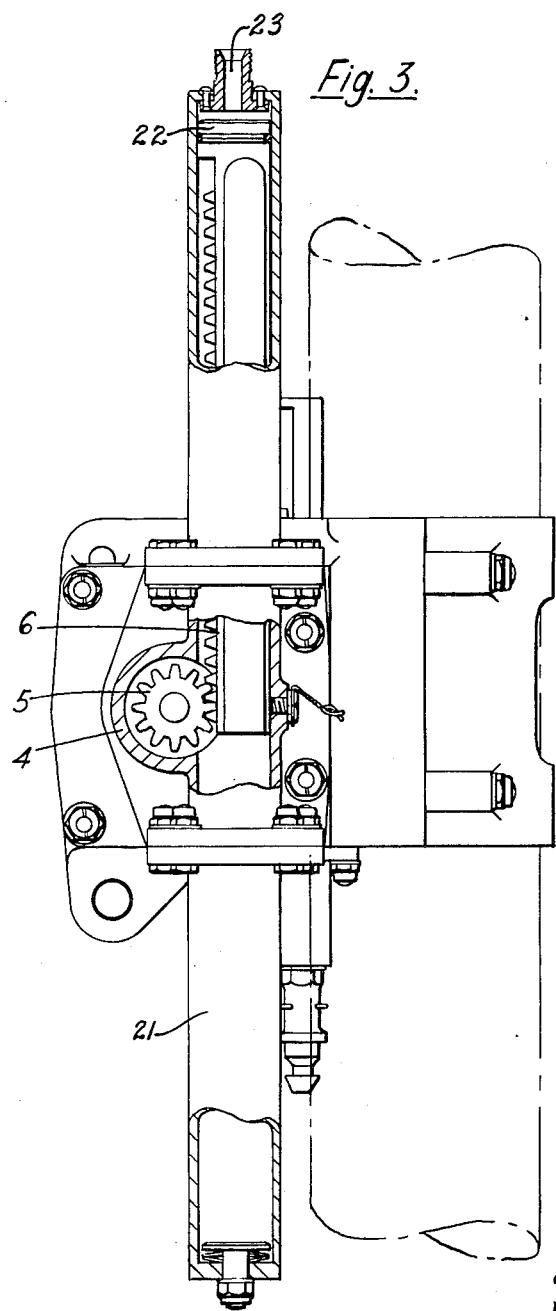
FIGURE 3 is a partly sectioned end view of the mechanism of FIGURE 1.

The retraction mechanism illustrated in the accompanying drawings is fully described in the specification of my said copending application. As disclosed in such specification, the retraction mechanism comprises a hollow shaft 1 mounted for rotation on the supporting frame 25 of an aircraft ejection seat, only partly shown in the drawing, the shaft 1 being formed integrally with a pair of reels 2 each having wound therearound a strap 3 passing forwardly from the reel 2 to constitute a harness shoulder strap for the seat occupant. One end of the hollow shaft 1 extends into a housing 4 and has a pinion 5 fixed thereto for co-operation with a rack 6. The rack is arranged for reciprocation in a cylinder 21 carried by the housing 4, the rack having a piston 22 on one end thereof so that admission of pressure fluid through the bore 23 to the cylinder 21 drives the rack 6 and rotates the pinion 5 by means of which the shaft 1 is rotated in the sense to wind in the shoulder straps 3 on to their respective reels 2.

The hollow shaft 1 is supported for rotation with respect to a central spindle 7 within the bore of the shaft 1, the spindle 7 having a torsion spring 8 arranged therearound and anchored at one end at 9 to the spindle and at its other end at 10 to the shaft, thereby to tend to rotate the hollow shaft 1 in the sense required to wind in the straps on to the reels 2 of the shaft 1. One end of the spindle 7 is anchored on the frame 25 against rotation.

The mechanism incorporates a forward reach facility provided by two ratchet wheels 11 on the hollow shaft 1 and a control pawl 12 associated with each wheel which may be held out of engagement with the ratchet wheel 11 by operation of a suitable forward reach control device associated with such pawl 12 to enable the straps to be paid out in response to forward movement of the occupant in the seat, but which may be engaged with the ratchet wheel 11 to prevent paying out of the straps without, however, hindering reeling-in of the straps under the influence of the torsion spring 8 or of the aforesaid rack 6. The pawls 12 are moved by rotating a shaft 13, such shaft carrying a radius arm (not shown) connected to a cable leading to an operating lever positioned on said seat so that the seat occupant may, by manual operation of said lever, engage or disengage said pawl 12 from the wheel 11.

Figure 4:
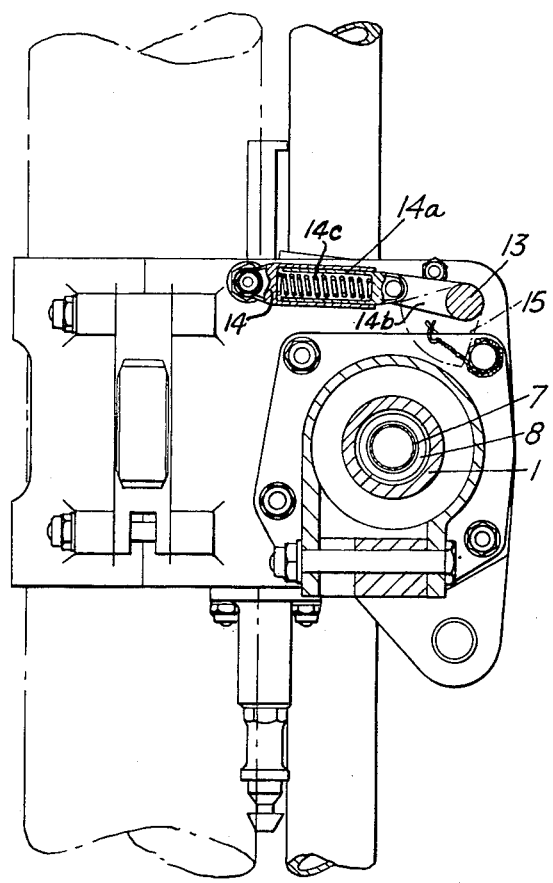
FIGURE 4 is a sectional view of the mechanism taken on the line IV—IV of FIGURE 1.

In this embodiment the control pawls 12 are associated with an "inertia lock" comprising an acceleration-sensitive over-centre spring toggle arrangement essentially consisting of two telescopically engaged hollow bars 14, 14a, an arm 14b, a helical compression spring 14c and associated pivots, as shown in FIG. 4. The arm 14b is fixed to the shaft 13 and hingedly attached to the end of the bar 14a projecting from the bar 14. The end of the latter remote from the arm 14b is pivotally attached to the supporting frame 25. The spring 14c is received in the communicating bores of the bars 14, 14a to bias the bar 14a outward of the bar 14. Abutments on the bars 14, 14a (not shown in detail) prevent the spring 14c from pivoting the arm 14b in a clockwise direction beyond the illustrated position. The spring 14c and a pendulous weight 15 act on the shaft 13 to cause, independently of the forward reach control device, engagement of the control pawl 12 with the ratchet wheel 11 in response to predetermined inertia loads, e.g. loads due to acceleration of the seat during ejection thereof, when the weight pivots the shaft 13 counterclockwise, as viewed in FIG. 4, beyond the dead-center position of the toggle arrangement.

In accordance with the present invention, a piston member 16 is arranged for reciprocation in a tubular guide 17 adjacent to the periphery of the ratchet wheel 11, this piston member 16 having a slot 17' housing a pawl 18 engaged by a spring-loaded plunger 19 which biasses the pawl towards engagement with the teeth of the ratchet wheel 11.

A spring 20, acting between said piston member 16 and the guide 17 for same, urges the piston member 16 in a direction corresponding to rotation of the ratchet wheel in the sense for paying out the harness shoulder straps 3 from their respective reels 2, and towards the illustrated position in which the pawl 18 is retracted clear of the ratchet wheel teeth by engagement with the wall of a guide channel 17a, coaxial with the guide 17, which is a part of the support structure of the seat.

The piston member 16 is coupled to a non-illustrated flexible cable in turn connected to a control lever, whereby manual operation of such lever, by the seat occupant, moves the piston member 16 in the direction opposed to the thrust of said spring 20, whereby the pawl 18 carried by the piston member 16 will engage the teeth of the ratchet wheel and rotate the same in the sense corresponding with winding-in of the harness shoulder straps 3.

From the foregoing description it will be understood that, when the control pawl 12 is engaged with the ratchet wheel 11 to prevent rotation of the latter in the sense for paying out the harness shoulder straps, reciprocation of the control lever will cause incremental rotation of the ratchet wheel 11 in the sense to wind-in the shoulder straps 3 on to the reels 2 for same, whereby the shoulder straps may be tightened to a desired degree.

I claim:
1. In a vehicle seat, in combination:
 (a) a support;
 (b) a harness strap;
 (c) a reel rotatably mounted on said support, a portion of said strap being attached to said reel;
 (d) spring means biasing said reel in the sense to wind said strap thereon; and
 (e) restraining means cooperable with said reel to restrain rotation thereof in the sense to pay out said strap, and manually operable actuating means for indexing said reel incrementally in a sense to wind said strap thereon, said restraining and actuating means including
  (1) a ratched wheel secured to said reel,
  (2) a piston member,
  (3) guide means guiding said piston member for movement thereof tangentially to said wheel between a first position and a second position,
  (4) a pawl mounted on said piston member for movement between an operative and a retracted position, said pawl being spaced from said ratchet wheel when in said retracted position,
  (5) first yieldably resilient means biasing said pawl toward the operative position thereof for engagement with said ratchet wheel when said piston member approaches said first position from said second position thereof,
  (6) engagement means on said guide means for holding said pawl in said retracted position thereof when said piston member is near said second position thereof, and
  (7) second yieldably resilient means biasing said piston member toward said second position.

2. In a vehicle seat as set forth in claim 1, said restraining means including a cotnrol pawl engageable with said ratchet wheel.

3. In a vehicle seat as set forth in claim 2, means responsive to a predetermined acceleration of said support to move said control pawl into engagement with the ratchet wheel.

References Cited by the Examiner
UNITED STATES PATENTS

| 730,868 | 6/1903 | Brown | 242—107.4 |
| 2,403,553 | 7/1946 | Rosinski | 242—100 X |
| 2,471,194 | 5/1949 | Capps | 74—128 |
| 2,630,181 | 3/1953 | Solum | 74—160 X |
| 2,838,190 | 6/1958 | Stevens | 242—107.4 X |
| 3,018,065 | 1/1962 | Cushman et al. | 242—107.4 |

FOREIGN PATENTS

| 195,891 | 4/1923 | Great Britain. |

MERVIN STEIN, *Primary Examiner.*